US011876673B2

(12) United States Patent
Miriyala et al.

(10) Patent No.: US 11,876,673 B2
(45) Date of Patent: Jan. 16, 2024

(54) STORING CONFIGURATION DATA CHANGES TO PERFORM ROOT CAUSE ANALYSIS FOR ERRORS IN A NETWORK OF MANAGED NETWORK DEVICES

(71) Applicant: Juniper Networks, Inc., Sunnyvale, CA (US)

(72) Inventors: Prasad Miriyala, San Jose, CA (US); Michael Henkel, Saratoga, CA (US); Iqlas M. Ottamalika, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/491,300

(22) Filed: Sep. 30, 2021

(65) Prior Publication Data

US 2023/0095442 A1 Mar. 30, 2023

(51) Int. Cl.
*H04L 41/0816* (2022.01)
*H04L 41/0853* (2022.01)
*H04L 41/0869* (2022.01)

(52) U.S. Cl.
CPC ...... *H04L 41/0816* (2013.01); *H04L 41/0853* (2013.01); *H04L 41/0869* (2013.01)

(58) Field of Classification Search
CPC ............. H04L 41/0816; H04L 41/0853; H04L 41/0869
USPC ........................................................ 709/220
See application file for complete search history.

(56) References Cited

U.S. PATENT DOCUMENTS

| 10,826,682 | B2 | 11/2020 | Subramaniam |
| 11,115,301 | B1 | 9/2021 | Margarian et al. |
| 2007/0113031 | A1* | 5/2007 | Brown ................... G06F 12/123 711/160 |
| 2016/0050116 | A1* | 2/2016 | Sheshadri ........... H04L 41/0853 709/221 |
| 2017/0093640 | A1* | 3/2017 | Subramanian ...... H04L 41/5058 |
| 2017/0374560 | A1* | 12/2017 | Judge .................... H04W 16/20 |
| 2019/0268212 | A1 | 8/2019 | Na et al. |
| 2020/0382372 | A1 | 12/2020 | Prasad et al. |
| 2021/0073208 | A1 | 3/2021 | Wong et al. |
| 2021/0119886 | A1 | 4/2021 | Singla et al. |

OTHER PUBLICATIONS

MSDN, Database Organizational Question, Jun. 29, 2009, social. msdn.microsoft.com, https://social.msdn.microsoft.com/Forums/en-US/13862c44-f589-4be4-adaf-a2ddcb47267c/database-organizational-question?forum=aspgettingstarted (Year: 2009).*

(Continued)

*Primary Examiner* — Zi Ye
(74) *Attorney, Agent, or Firm* — Shumaker & Sieffert, P.A.

(57) ABSTRACT

An example application programming interface (API) server device that distributes configuration data to managed network devices includes one or more processing units implemented in circuitry and configured to receive configuration data to be deployed to at least one of the managed network devices; store the configuration data to a configuration database; and send the configuration data to the at least one of the managed network devices. In this manner, the configuration data can be archived for later retrieval and analysis, e.g., to perform root cause analysis in the event of an error.

13 Claims, 4 Drawing Sheets

(56) References Cited

OTHER PUBLICATIONS

Deanna Wenstrup, Database Sharding and Partitioning, Jan. 9, 2018, profitpoint.com, https://profitpt.com/2018/01/09/supply_chain_optimization_database_sharding_partitioning/ (Year: 2018).*

Extended Search Report from counterpart European Application No. 22199198.7 dated Feb. 1, 2023, 8 pp.

Response to Extended Search Report dated Feb. 1, 2023, from counterpart European Application No. 22199198.7 filed Oct. 2, 2023, 18 pp.

* cited by examiner

STORING CONFIGURATION DATA CHANGES TO PERFORM ROOT CAUSE ANALYSIS FOR ERRORS IN A NETWORK OF MANAGED NETWORK DEVICES

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing network devices. A network management system (NMS) device, also referred to herein as a controller device, may configure network devices using low-level (that is, device-level) configuration data, e.g., expressed in Yet Another Next Generation (YANG) data modeling language. Moreover, the controller device may manage the network devices based on the configuration data for the network devices. According to the techniques of this disclosure, In one example, a method of managing configuration data for managed network devices, the method including: receiving, by an application programming interface (API) server, configuration data to be deployed to at least one of the managed network devices; storing, by the API server, the configuration data to a configuration database; and sending, by the API server, the configuration data to the at least one of the managed network devices.

In another example, an application programming interface (API) server device distributes configuration data to managed network devices. The API server device includes one or more processing units implemented in circuitry and configured to receive configuration data to be deployed to at least one of the managed network devices; store the configuration data to a configuration database; and send the configuration data to the at least one of the managed network devices.

In another example, a computer-readable storage medium has stored thereon instructions that, when executed, cause a processor of a (API) server device that distributes configuration data to managed network devices to receive configuration data to be deployed to at least one of the managed network devices; store the configuration data to a configuration database; and send the configuration data to the at least one of the managed network devices.

The details of one or more examples are set forth in the accompanying drawings and the description below. Other features, objects, and advantages will be apparent from the description and drawings, and from the claims.

DETAILED DESCRIPTION

Figure 1:
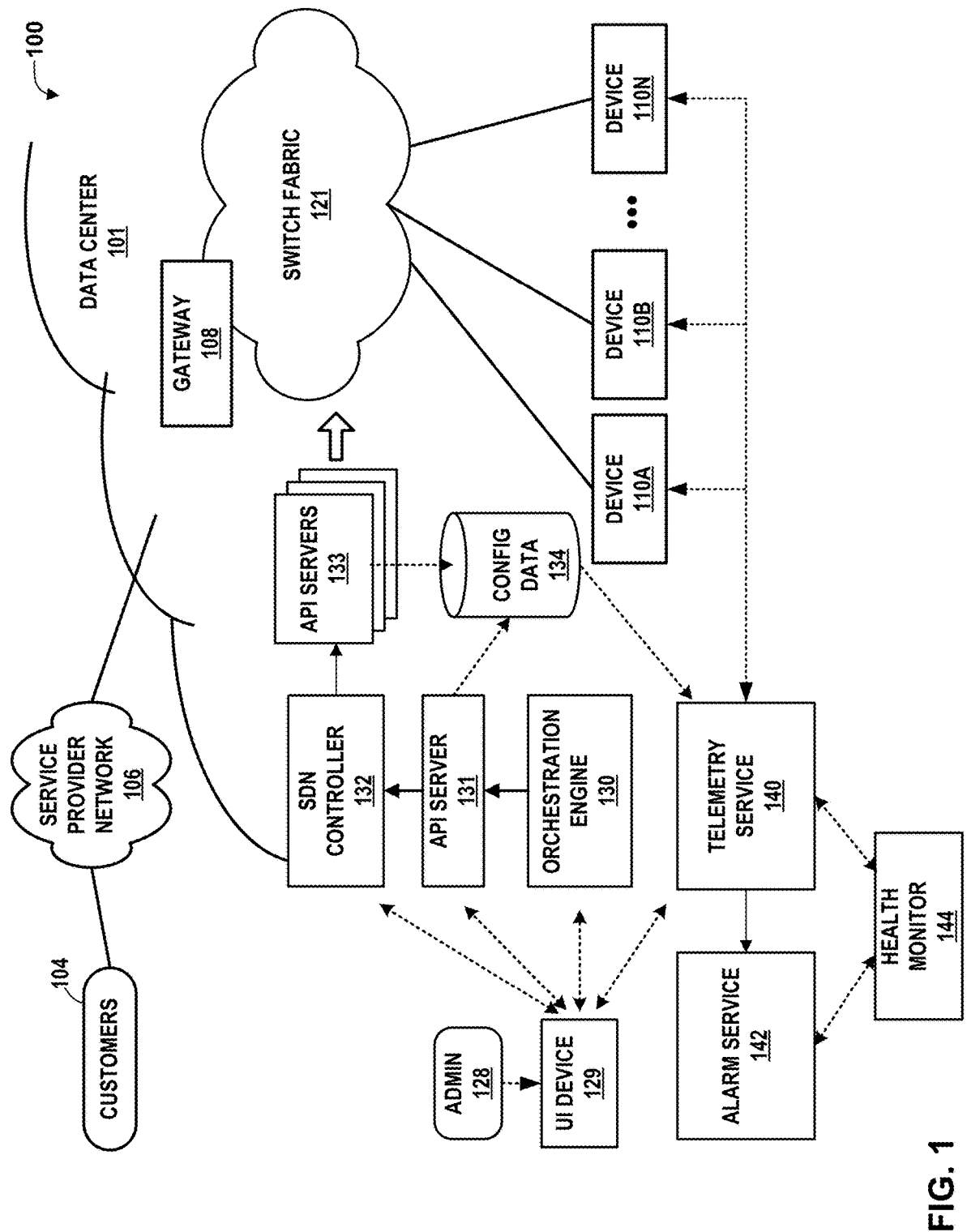
FIG. 1 is a conceptual diagram illustrating an example network that includes an intent based telemetry collection service, in accordance with one or more aspects of the present disclosure.

FIG. 1 is a conceptual diagram illustrating an example network that includes an intent based telemetry service 140 in a network, for example, a network within a data center, in accordance with one or more aspects of the present disclosure. FIG. 1 illustrates one example implementation of a network system 100 and a data center 101 that hosts one or more computing networks, computing domains or projects, and/or cloud-based computing networks. Network system 100 may include a virtualized computing infrastructure, such as one or more cloud-based computing clusters that may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments, collections of bare metal servers, Contrail or Tungsten clusters, or other computing clusters, domains, networks and the like. Other implementations of network system 100 and data center 101 may be appropriate in other instances. Such implementations may include a subset of the components included in the example of FIG. 1 and/or may include additional components not shown in FIG. 1.

In the example of FIG. 1, data center 101 provides an operating environment for applications and services for customers 104 coupled to data center 101 by service provider network 106. Although functions and operations described in connection with network system 100 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, or functions attributed to one or more components, devices, or modules may be attributed to other components, devices, and/or modules, even if not specifically described herein in such a manner.

Data center 101 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 101 may represent one of many geographically distributed network data centers. As illustrated in the example of FIG. 1, data center 101 is a facility that provides network services for customers 104. Customers 104 may be collective entities such as enterprises and governments or individuals. For example, a network data center may host web services for several enterprises and end users. Other example services may include data storage, virtual private networks, traffic engineering, file service, data mining, scientific- or super-computing, and so on.

In the example of FIG. 1, data center 101 includes a set of storage systems, application servers, compute nodes, or other devices, including device 110A through device 110N (collectively "devices 110," representing any number of devices). Devices 110 may be interconnected via high-speed switch fabric 121 provided by one or more tiers of physical network switches and routers. In some examples, devices 110 may be included within fabric 121, but are shown separately for ease of illustration.

Devices 110 may represent any of a number of different types of devices (core switches, spine network devices, leaf network devices, edge network devices, or other network devices), but in some examples, one or more devices 110 may represent physical compute nodes and/or storage nodes of the data center. For example, one or more of devices 110 may provide an operating environment for execution of one or more customer-specific applications or services. Alternatively, or in addition, one or more of devices 110 may provide an operating environment for one or more virtual machines or other virtualized instances, such as containers. In some examples, one or more of devices 110 may be alternatively referred to as a host computing device or, more simply, as a host. A device 110 may thereby execute one or more virtualized instances, such as virtual machines, containers, or other virtual execution environment for running one or more applications or services, such as virtualized network functions (VNFs).

In general, each of devices 110 may be any type of device that may operate on a network and which may generate data (e.g., connectivity data, flow data, sFlow data, resource utilization data) accessible through telemetry or otherwise, which may include any type of computing device, sensor, camera, node, surveillance device, or other device. Further, some or all of devices 110 may represent a component of another device, where such a component may generate data collectible through telemetry or otherwise. For example, some or all of devices 110 may represent physical or virtual devices, such as switches, routers, hubs, gateways, security devices such as firewalls, intrusion detection, and/or intrusion prevention devices.

Although not specifically shown, switch fabric 121 may include top-of-rack (TOR) switches coupled to a distribution layer of chassis switches, and data center 101 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other devices. Switch fabric 121 may perform layer 3 routing to route network traffic between data center 101 and customers 104 by service provider network 106. Gateway 108 acts to send and receive packets between switch fabric 121 and service provider network 106.

In some examples, orchestration engine 130 manages functions of data center 101 such as compute, storage, networking, and application resources. Orchestration engine 130 may implement a security policy across a group of VMs or to the boundary of a tenant's network. Orchestration engine 130 may deploy a network service (e.g., a load balancer) in a tenant's virtual network.

Software-Defined Networking ("SDN") controller 132 provides a logically and in some cases physically centralized controller for facilitating operation of one or more virtual networks within data center 101 in accordance with one or more examples of this disclosure. In some examples, SDN controller 132 operates in response to configuration input received from orchestration engine 130 via northbound application programming interface (API) server 131, which in turn may operate in response to configuration input received from an administrator 128 interacting with and/or operating user interface device 129. SDN controller 132 may create a virtual network for a tenant within data center 101 or across data centers. SDN controller 132 may attach virtual machines (VMs) to a tenant's virtual network. SDN controller 132 may connect a tenant's virtual network to an external network, e.g., the Internet or a VPN.

In some examples, SDN controller 132 manages the network and networking services such load balancing, security, and may allocate resources from devices 110 that serve as host devices to various applications via southbound API servers 133. That is, southbound API servers 133 represent servers that execute a set of communication protocols utilized by SDN controller 132 to make the actual state of the network equal to the desired state as specified by orchestration engine 130. For example, SDN controller 132 may implement high-level requests from orchestration engine 130 by configuring physical switches, e.g., top-of-rack (TOR) switches, chassis switches, and switch fabric 121; physical routers; physical service nodes such as firewalls and load balancers; and virtual services such as virtual firewalls in a VM. SDN controller 132 maintains routing, networking, and configuration information within a state database. Different cloud computing clusters may have separate instances of SDN controller 132.

Use of multiple API servers 133 may allow for high availability and load balancing. That is, if one of API servers 133 goes offline (e.g., for maintenance or as a result of a device error), the other remaining API servers 133 may still continue to operate. In addition, tasks performed by API servers 133 may be distributed across API servers 133, so as to prevent any one of API servers 133 from becoming overloaded.

In accordance with the techniques of this disclosure, API servers 131, 133 may be configured to store historical and current configuration data to configuration database (config data) 134. Configuration database 134 may be an etcd database. Admin 128 may issue configuration instructions to API servers 131, 133 via UI device 129 regarding storage of historical and current configuration data. For example, API servers 131, 133 may be configured to store periodic slices of configuration data for a sliding window of time in configuration database 134. As one example, API servers 131, 133 may store a set of intents and a set of configuration data (i.e., current configuration data for each managed network device, e.g., devices 110, gateway 108, switches of switch fabric 121, or the like) every 15 minutes and store data for a seven-day sliding window, e.g., in a first-in, first-out (FIFO) manner. In such an example, 672 slices would be maintained in the configuration database.

Storing configuration data in this manner allows for analysis in the event of an error. In particular, if an error in the network occurs, the error may have occurred due to updated configuration. For example, if the updated configuration was not compatible with other configuration already deployed to, e.g., devices 110 or if there was a conflict between parts of the newly deployed configuration data. In such a case, the time of the error can be used to determine what sets of configuration had been changed prior to the time of the error. Then, an administrator can determine whether the configuration change caused the error, and if so, update the configuration to remediate the error.

Telemetry service 140 can configure devices 110 (and/or other devices) to generate and provide telemetry data related to the operations of devices 110. Such data can include process usage data, memory usage data, network usage data, error counts etc. Telemetry service 140 can be configured to collect the telemetry data from devices 110 using protocols supported by the devices 110. Applications, processes, threads etc. can subscribe to the collected telemetry data in order to be notified telemetry data is available for a device or devices on a network. In some examples, telemetry service 140 may analyze telemetry data from devices 110 to determine, e.g., whether an error has occurred in one of devices 110, and further, whether a configuration change was the cause of the error. If the configuration change was the cause, telemetry service 140 may further determine the configuration change that was the cause of the error, e.g., through querying API servers 131, 133 to retrieve historical configuration for devices 110, determining when the error occurred, and determining which configuration changes were made prior to the occurrence of the error.

User interface device 129 may be implemented as any suitable device for presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than controller 132. In such examples, user interface device 129 may communicate with controller 132 over a network or other means of communication. In other examples, user interface device 129 may be a local peripheral of controller 132 or may be integrated into controller 132.

In some aspects, user interface device 129 may communicate with telemetry service 140 or a component thereof to configure the telemetry service 140 to configure devices to provide telemetry data using high-level statements of intent and to receive telemetry data from devices 110 and other components of data center 101 via telemetry service 140. In some aspects, telemetry service 140 may be configured by applications or services that use telemetry data obtained via telemetry service 140. For example, an alarm service (not shown) or components of an alarm service may configure telemetry service 140 to collect and provide telemetry data from devices 110.

Alarm service 142 may be a consumer of telemetry data collected by telemetry service 140. Alarm service 142 may implement services and rules that can be used to subscribe to telemetry data and analyze the telemetry data according to rules that determine if an alarm should be generated based on the telemetry data.

Health monitor 144 is an optional component that can utilize metrics associated with services and components of system 100 and determine the health of components. In the example illustrated in FIG. 1, health monitor 144 can obtain metrics regarding the operation of telemetry service 140 and/or alarm service 142 and use the metrics to determine if new instances of a service should be created in response to system growth or failures of components in telemetry service 140 and/or alarm service 142.

Figure 2:
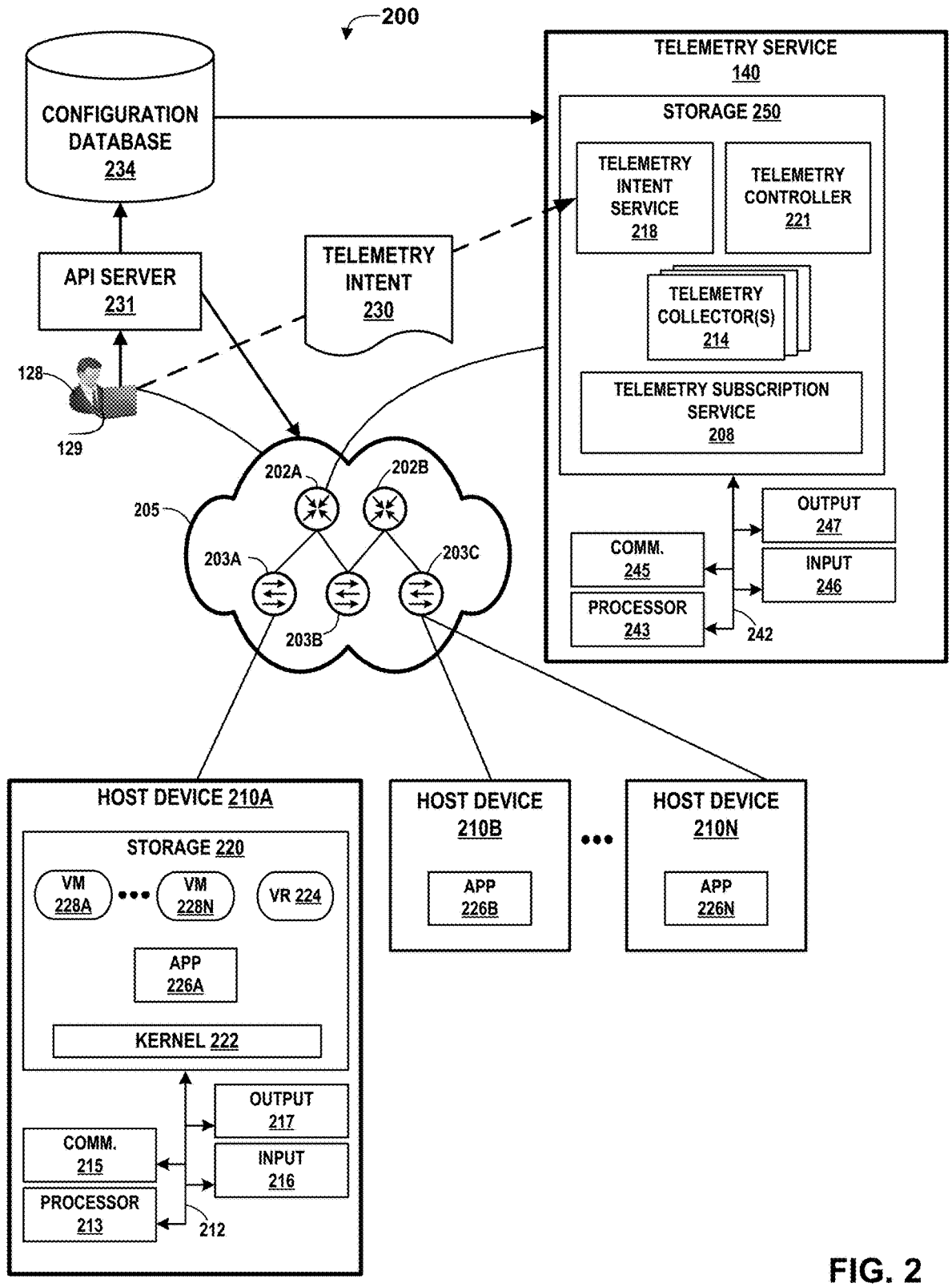
FIG. 2 is a block diagram illustrating an example system including a telemetry collection service in a network and/or within a data center, in accordance with one or more aspects of the present disclosure.

FIG. 2 is a block diagram illustrating an example system including a telemetry service in a network and/or within a data center, in accordance with one or more aspects of the present disclosure. Network system 200 of FIG. 2 may be described as an example or alternative implementation of network system 100 of FIG. 1. One or more aspects of FIG. 2 may be described herein within the context of FIG. 1.

Although a data center, such as that illustrated in FIG. 1 and FIG. 2 may be operated by any entity, some data centers are operated by a service provider, where the business model of such a service provider may involve providing computing capacity to customers or clients. For this reason, data centers usually contain a huge number of compute nodes, or host devices. In order to operate efficiently, those hosts have to be connected to each other and to the external world, and that ability is provided through physical devices, which may be interconnected in a leaf-spine topology. The collection of these physical devices, such as network devices and host devices, form the underlay network.

Each host device in such a data center may have several virtual machines running on it, which may be referred to as workloads. Clients of the data center usually have access to these workloads, and can install applications and perform other operations using such workloads. Workloads that run on different host devices but are accessible by one particular client are organized into a virtual network. Each client usually has at least one virtual network. Those virtual networks are also called overlay networks. In some cases, a client of the data center may experience network issues such as increased latency, packet loss, low network throughput, or slow workload processing. Troubleshooting such issues may be complicated by the deployment of workloads in a large multitenant data center. Telemetry data such as that provided by telemetry service 140 may be used to facilitate troubleshooting in a data center.

In the example of FIG. 2, network 205 connects telemetry service 140, host device 210A, and host devices 210B-210N. Telemetry service 140 may correspond to an example or alternative implementation of telemetry service 140 illustrated in FIG. 1. Host devices 210A, 210B, through 210N may be collectively referenced as "host devices 210," representing any number of host devices 210.

Each of host devices 210 may be an example of devices 110 of FIG. 1, but in the example of FIG. 2, each of host devices 210 is implemented as a server or host device that operates as a physical or virtualized compute node or a storage node of a virtualized data center, as opposed to a network device. As further described herein, one or more of host devices 210 (e.g., host device 210A of FIG. 2) may execute multiple virtual computing instances, such as virtual machines 228, and in addition, one or more of host devices 210 (e.g., one or more of host devices 210B through 210N) may execute applications or service modules on a non-virtualized, single-tenant, and/or bare metal server. Accordingly, as in FIG. 1, the example of FIG. 2 illustrates a network system that may include a mix of virtualized server devices and bare metal server devices.

Also connected to network 205 is user interface device 129, which may be operated by administrator 128, as in FIG. 1. In some examples, user interface device 129 may present, at a display device associated with user interface device 129, one or more user interfaces.

Network 205 may correspond to any of switch fabric 121 and/or service provider network 106 of FIG. 1, or alternatively, may correspond to a combination of switch fabric 121, service provider network 106, and/or another network. Although not shown in FIG. 2, network 205 may also include some of the components of FIG. 1, including gateway 108, SDN controller 132, and orchestration engine 130.

Illustrated within network 205 are spine devices 202A and 202B (collectively "spine devices 202" and representing any number of spine devices 202), as well as leaf device 203A, 203B, and leaf device 203C (collectively "leaf devices 203" and also representing any number of leaf devices 203). Although network 205 is illustrated with spine devices 202 and leaf devices 203, other types of devices may be included in network 205, including core switches, edge devices, top-of-rack devices, and other devices.

In general, network 205 may be the Internet, or may include or represent any public or private communications network or other network. For instance, network 205 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 205 using any suitable communication techniques. Network 205 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 205 using one or more network links. The links coupling such devices or systems to network 205 may be Ethernet, Asynchronous Transfer Mode (ATM) or other types of network connections, and such connections may be wireless and/or wired connections. One or more of the devices or systems illustrated in FIG. 2 or otherwise on network 205 may be in a remote location relative to one or more other illustrated devices or systems.

Each of host devices 210 represents a physical computing device or compute node or storage node that provides an execution environment for virtual hosts, virtual machines, containers, and/or other real or virtualized computing resources. In some examples, each of host devices 210 may be a component of a cloud computing system, server farm, and/or server cluster (or portion thereof) that provides services to client devices and other devices or systems.

Certain aspects of host devices 210 are described herein with respect to host device 210A. Other host devices 210 (e.g., host device 210B through 210N) may be described similarly, and may also include like-numbered components that may represent the same, similar, or corresponding components, devices, modules, functionality, and/or other features. Descriptions herein with respect to host device 210A may therefore correspondingly apply to one or more other host devices 210 (e.g., host device 210B through host device 210N).

In the example of FIG. 2, host device 210A includes underlying physical compute hardware that includes one or more processors 213, one or more communication units 215, one or more input devices 216, one or more output devices 217, and one or more storage devices 220. In the example shown, storage devices 220 may include kernel module 222 and virtual router module 224. Storage devices 220 may also include virtual machines 228A through 228N (collectively "virtual machines 228" and representing any number of virtual machines 228), when present, may execute on top of a hypervisor (not shown) or may be controlled by a hypervisor. One or more of the devices, modules, storage areas, or other components of host device 210A may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Processor 213 may implement functionality and/or execute instructions associated with host device 210A. Communication unit 215 may communicate with other devices or systems on behalf of host device 210A. One or more input devices 216 and output devices 217 may represent any other input and/or output devices associated with host device 210A. Storage devices 220 may store information for processing during operation of host device 210A. Each of such components may be implemented in a manner similar to those described herein in connection with alarm service 140 or otherwise.

Virtual router module 224 may execute multiple routing instances for corresponding virtual networks within data center 101 (FIG. 1) and may route packets to appropriate virtual machines executing within the operating environment provided by devices 110. Virtual router module 224 may also be responsible for collecting overlay flow data, such as Contrail Flow data when used in an infrastructure in which the Contrail SDN is employed.

Virtual machine 228A through virtual machine 228N (collectively "virtual machines 228," representing any number of virtual machines 228) may represent example instances of virtual machines 228. Host device 210A may partition the virtual and/or physical address space provided by storage device 220 into user space for running user processes. Host device 210A may also partition virtual and/or physical address space provided by storage device 220 into kernel space, which is protected and may be inaccessible by user processes.

Each of virtual machines 228 may represent a tenant virtual machine running customer applications such as Web servers, database servers, enterprise applications, or hosting virtualized services used to create service chains. In some cases, any one or more of host devices 210 or another computing device hosts customer applications directly, i.e., not as virtual machines (e.g., one or more of host devices 210B through 210N, such as host device 210B and host device 210N). Although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on host devices 210.

In the example of FIG. 2, telemetry service 140 may include one or more processors 243, one or more communication units 245, one or more input devices 246, one or more output devices 247 and one or more storage devices 250. Storage devices 250 may include intent service 218, telemetry controller 221, telemetry subscription service 208, and telemetry collectors 214.

One or more of the devices, modules, storage areas, or other components of telemetry service 140 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

One or more processors 243 of alarm service 140 may implement functionality and/or execute instructions associated with alarm service 140 or associated with one or more modules illustrated herein and/or described herein. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device.

One or more communication units 245 of alarm service 140 may communicate with devices external to alarm service 140 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. Examples of communication units 245 include a network interface card (e.g., such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of alarm service 140 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera).

One or more output devices 247 may represent any output devices of alarm service 140 not otherwise separately described herein. One or more output devices 247 may generate, receive, and/or process input from any type of device capable of detecting input from a human or machine.

For example, one or more output devices 247 may generate, receive, and/or process output in the form of electrical and/or physical output (e.g., peripheral device, actuator).

One or more storage devices 250 within alarm service 140 may store information for processing during operation of alarm service 140. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of alarm service 140 and/or one or more devices or systems illustrated as being connected to alarm service 140.

In some examples, one or more storage devices 250 are implemented through temporary memory, which may mean that a primary purpose of the one or more storage devices is not long-term storage. Storage devices 250 of alarm service 140 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Intent service 218 receives telemetry intent 230 that expresses, at a high level, telemetry requirements for generating and collecting telemetry data. The telemetry intent 230 may be in a natural language. As an example, a telemetry intent 230 may be "collect cpu resource usage metrics from all the devices at 1 minute granularity." As a further example, a telemetry intent 230 may be "collect memory resource usage from devices routerA, routerB and routerC." Intent service 218 may translate the telemetry intent 230 into one or more lower level telemetry commands and protocols that implement the telemetry intent 230. In some cases, a device may support more than one telemetry protocol. In such cases, intent service may translate the telemetry intent 230 using a protocol that may be selected according to criteria such as a priority assigned to the protocol, device capabilities with respect to the protocol, and overhead associated with the protocol. Further, in some aspects, intent service 218 may reconcile intents for multiple applications that request telemetry data from the same device. Intent service 218 can send the lower level telemetry commands and an indication of the selected protocol to telemetry controller 221 to update telemetry collection for affected devices.

Telemetry controller 221 can receive the lower level telemetry commands and an indication of the selected protocol. In some aspects, telemetry controller 221 maintains the most recent telemetry requirements for each device. Telemetry controller 221 can provision telemetry collectors 214 for devices such as leaf devices 203 and spine devices 202 that are specified by the telemetry commands and protocols as translated from telemetry intent 230.

Telemetry subscription service 208 receives requests to subscribe to telemetry data produced by devices. In some aspects, in response to receiving a subscription, telemetry controller 221 may provision telemetry collectors 214 if a telemetry collector has not already been provisioned for the device.

Telemetry collectors 214 collect telemetry data from devices. Telemetry collectors 214 can store collected data in a cache or database (not shown). Telemetry service 140 can provide the collected data to applications (e.g., applications 226) that have subscribed to the data.

In addition, administrator 128 may use user interface device 129 to send configuration data to, e.g., host devices 210 via API server 231 and network 205. API server 231 may provide the configuration data to network 205 to ultimately configure host devices 210. Moreover, according to the techniques of this disclosure, API server 231 may store the configuration data to configuration database 234. For example, configuration database 234 may be configured to store configuration data in slices over a sliding window, e.g., 15 minute slices over a 7 day sliding window. That is, configuration database 234 may represent the state of configuration data for host devices 210 for a period of time corresponding to each slice, and may do so for a number of slices.

Furthermore, telemetry service 140 may retrieve the configuration data from configuration database 234, e.g., in the event of an error. Telemetry service 140 may determine a time at which the error occurred and determine which configuration changes were made prior to the error. If configuration changes were made that conflict, administrator 128 may receive data via user interface device 129 from telemetry service 140 indicating the change, and then update the configuration data to ameliorate the conflict.

Figure 3:
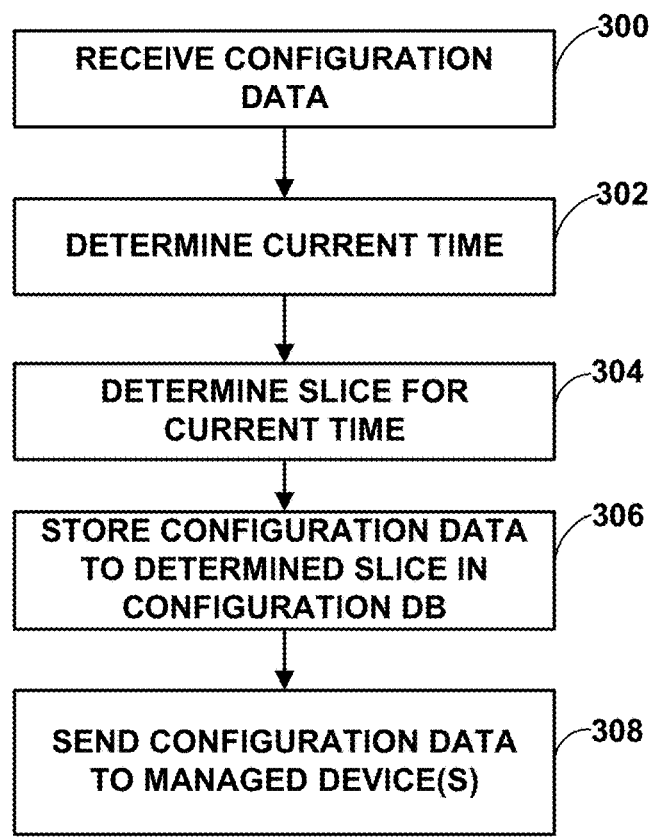
FIG. 3 is a flowchart illustrating an example method of managing configuration data to managed network devices according to the techniques of this disclosure.

FIG. 3 is a flowchart illustrating an example method of managing configuration data for managed network devices according to the techniques of this disclosure. The method of FIG. 3 is performed by an API server, such as API servers 131, 133 of FIG. 1 or API server 231 of FIG. 2.

Initially, the API server receives configuration data, e.g., from a user interface device (e.g., UI device 129 of FIGS. 1 and 2) (300). The configuration data may generally represent an update to existing configuration data for managed network devices, such as one or more of host devices 110 (FIG. 1) or 210 (FIG. 2).

The API server may then determine a current time (302) and a slice in a configuration database (304) (e.g., configuration database 134 of FIG. 1 or 234 of FIG. 2). In particular, the API server may partition the configuration database into slices, each of which may store configuration data for a certain time duration, e.g., 15 minutes. The API server may further maintain a certain number of slices, e.g., 672 slices (which may allow for storage of 15-minute slices over seven days). As the oldest slice expires, the API server may delete the data of that oldest slice to allow for storage of a new slice, in a first-in, first-out (FIFO) manner. Accordingly, the API server may store the newly received configuration data to the determined slice corresponding to the current time period (306). Furthermore, the API server may distribute the configuration data to the managed network device(s) (308).

In this manner, the method of FIG. 3 represents an example of a method of managing configuration data for managed network devices, the method including receiving, by an application programming interface (API) server, configuration data to be deployed to at least one of the managed network devices; storing, by the API server, the configuration data to a configuration database; and sending, by the API server, the configuration data to the at least one of the managed network devices.

Figure 4:
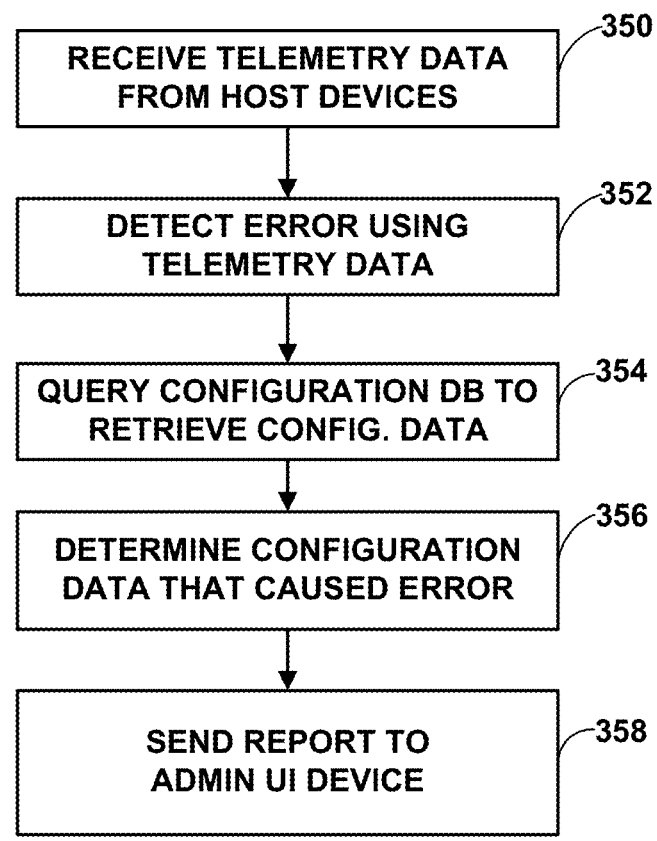
FIG. 4 is a flowchart illustrating an example method of using stored configuration data to determine a root cause of an error in a network according to the techniques of this disclosure.

FIG. 4 is a flowchart illustrating an example method of using stored configuration data to determine a root cause of an error in a network according to the techniques of this disclosure. The method of FIG. 4 may be performed by a telemetry device, such as a device performing telemetry service 140 of FIG. 1 or 2.

Initially, the telemetry device subscribes to telemetry data from host devices, such as host devices 110 (FIG. 1) or 210 (FIG. 2). Thus, the telemetry device may receive telemetry data from the host devices (350). The telemetry device may then analyze the telemetry data and detect an error using the telemetry data (352).

Thus, the telemetry device may query the configuration database to retrieve configuration data of one or more slices corresponding to times at or earlier than the detected error (354). The telemetry device may then determine the configuration data that caused the error (356). For example, the telemetry device may determine which of the host devices (or services performed by the devices) is encountering the error. The telemetry device may then analyze the slices of the configuration database to determine whether any configuration changes were made to the corresponding one of the host devices. The telemetry device may then determine that a configuration change to the one of the host devices preceding the detection of the error is or may be the cause of the error. Thus, the telemetry device may send a report to the administrator user interface device 129 (358) indicating the device and the determined configuration that caused the error. Thus, the administrator may use this report to revise configuration of the corresponding one of the host devices.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method of managing configuration data for managed network devices, the method comprising:
receiving, by an application programming interface (API) server device from a controller device that manages the managed network devices via a network that communicatively couples the controller device to the API server device, configuration data to be deployed to at least one of the managed network devices, the API server device being separate from the controller device;
storing, by the API server device, the configuration data to a configuration database device via the network, wherein the network communicatively couples the API server device to the configuration database device, the configuration database device being separate from the controller device, and the configuration database device being separate from the API server device;
partitioning, by the API server device, the configuration database into a plurality of slices, each of the slices representing configuration data for the managed network devices for a corresponding period of time; and
sending, by the API server device, the configuration data to the at least one of the managed network devices via the network, wherein the network communicatively couples the API server device to the managed network devices, the API server device being separate from the managed network devices.

2. The method of claim 1, further comprising determining a current slice of the configuration database in which to store the configuration data.

3. The method of claim 1, wherein each of the slices represents configuration data for a corresponding fifteen minute interval, the method further comprising maintaining 672 slices in the configuration database.

4. The method of claim 1, further comprising replacing oldest configuration data stored in the configuration database with current configuration data including the received configuration data.

5. An application programming interface (API) server system that distributes configuration data to managed network devices, the API server system comprising a processing system comprising one or more processing units implemented in circuitry and configured to:

receive, via a network, configuration data to be deployed to at least one of the managed network devices from a controller device that manages the managed network devices, the API server system being separate from the controller device, the network communicatively coupling the API server system to the controller device;

store, via the network, the configuration data to a configuration database device, the configuration database device being separate from the controller device, the network communicatively coupling the API server system to the configuration database device, and the configuration database device being separate from the API server system;

partition the configuration database into a plurality of slices, each of the slices representing configuration data for the managed network devices for a corresponding period of time; and send, via the network, the configuration data to the at least one of the managed network devices, the network communicatively coupling the API server system to the managed network devices, and the API server system being separate from the managed network devices.

6. The API server system of claim 5, wherein the processing system is further configured to determine a current slice of the configuration database in which to store the configuration data.

7. The API server system of claim 5, wherein each of the slices represents configuration data for a corresponding fifteen minute interval, and wherein the processing system is further configured to maintain 672 slices in the configuration database.

8. The API server system of claim 5, wherein the processing system is further configured to replace oldest configuration data stored in the configuration database with current configuration data including the received configuration data.

9. A non-transitory computer-readable storage medium having stored thereon instructions that, when executed, cause a processor of an application programming interface (API) server device that distributes configuration data to managed network devices to:

receive, via a network, configuration data to be deployed to at least one of the managed network devices from a controller device that manages the managed network devices, the network communicatively coupling the API server device to the controller device, the API server device being separate from the controller device;

store, via the network, the configuration data to a configuration database device, the network communicatively coupling the API server device to the configuration database device, the configuration database being separate from the controller device, and the configuration database being separate from the API server device;

partition the configuration database into a plurality of slices, each of the slices representing configuration data for the managed network devices for a corresponding period of time; and send, via the network, the configuration data to the at least one of the managed network devices, the network communicatively coupling the API server device to the managed network devices, the API server device being separate from the managed network devices.

10. The non-transitory computer-readable storage medium of claim 9, further comprising instructions that cause the processor to determine a current slice of the configuration database in which to store the configuration data.

11. The non-transitory computer-readable storage medium of claim 9, wherein each of the slices represents configuration data for a corresponding fifteen minute interval, further comprising instructions that cause the processor to maintain 672 slices in the configuration database.

12. The non-transitory computer-readable storage medium of claim 9, further comprising instructions that cause the processor to replace oldest configuration data stored in the configuration database with current configuration data including the received configuration data.

13. The method of claim 1, wherein sending the configuration data comprises sending the configuration data via a switch fabric.

* * * * *